United States Patent
Park et al.

(10) Patent No.: US 7,378,786 B2
(45) Date of Patent: May 27, 2008

(54) SURFACE LIGHT SOURCE DEVICE AND LIQUID CRYSTAL DISPLAY APPARATUS HAVING THE SAME

(75) Inventors: Hae-Il Park, Seoul (KR); In-Sun Hwang, Suwon-si (KR); Jin-Seob Byun, Seoul (KR); Sang-Yu Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 621 days.

(21) Appl. No.: 11/078,492

(22) Filed: Mar. 14, 2005

(65) Prior Publication Data

US 2005/0200265 A1 Sep. 15, 2005

(30) Foreign Application Priority Data

Mar. 15, 2004 (KR) .................... 10-2004-0017271

(51) Int. Cl.
*H01J 1/62* (2006.01)
(52) U.S. Cl. ............... 313/491; 313/493; 313/631; 313/634

(58) Field of Classification Search ........... 313/491, 313/493, 631, 634, 594, 601
See application file for complete search history.

(56) References Cited

U.S. PATENT DOCUMENTS

2005/0200280 A1* 9/2005 Ko et al. .................... 313/623
2006/0091774 A1* 5/2006 Park et al. ................. 313/317

* cited by examiner

*Primary Examiner*—Vip Patel
(74) *Attorney, Agent, or Firm*—MacPherson Kwok Chen & Heid LLP

(57) ABSTRACT

A surface light source device may include a first substrate and a second substrate having a plurality of space-dividing portions to divide an inner space between the first and second substrates into a plurality of discharge regions. First and second electrodes may be formed on an outer face of the first substrate or the second substrate, and the first and second electrodes have a plurality of openings corresponding to the space-dividing portions. The openings have a first opening width along a longitudinal direction of the space-dividing portions, which is smaller than a line width of the first and second electrodes. The light source may be used in a flat panel display apparatus, such as a liquid crystal display apparatus.

21 Claims, 9 Drawing Sheets

SURFACE LIGHT SOURCE DEVICE AND LIQUID CRYSTAL DISPLAY APPARATUS HAVING THE SAME

CROSS-REFERENCE TO RELATED APPLICATION

This application claims priority to and the benefit of Korean Patent Application No. 10-2004-0017271, filed on Mar. 15, 2004, which is hereby incorporated by reference for all purposes as if fully set forth herein.

BACKGROUND OF THE INVENTION

1. Field of the Invention

The present invention relates to a surface light source device and a liquid crystal display apparatus having the surface light source device. More particularly, the present invention relates to a surface light source device having an electrode to which a discharge voltage is applied and a liquid crystal display apparatus having the surface light source device.

2. Discussion of the Background

Generally, a liquid crystal display apparatus is a flat panel display apparatus that uses liquid crystals to display images. It has various advantages, including it may be small and lightweight. Further, since it does not consume a lot of power, it is widely applied to various electronic instruments.

The liquid crystal display apparatus requires a light source since its display panel is not self-emissive.

A tubular-shaped cold cathode fluorescent lamp is often used for the liquid crystal display apparatus' light source. In this case, the liquid crystal display apparatus may be broadly classified as an edge illumination type or a direct illumination type. In the edge illumination type, the light source is positioned adjacent to a side surface of a transparent light guide plate, and the light source's light reflects from the light guide plate and is applied to the liquid crystal display panel. In the direct illumination type, the light source is disposed under the liquid crystal display panel, a diffusing plate is disposed between the light source and the panel, and a reflecting plate is disposed under the light source. Therefore, before the light is applied to the liquid crystal display panel, the reflecting plate reflects it, and the diffusing plate diffuses it.

However, since the optical member, (e.g. the light guide plate, the diffusing plate, etc.) may induce light loss, this decreases the liquid crystal display apparatus' light efficiency. Furthermore, the apparatus' manufacturing cost may increase and its brightness uniformity may deteriorate.

Hence, a surface light source device emitting a planar light has been developed to reduce manufacturing costs and enhance brightness uniformity. Generally, the surface light source device may include a light source body having a plurality of adjacent discharge spaces and an electrode formed at each end of the light source body to apply a discharge voltage to it. The discharge spaces may be internally connected to each other so discharge gas may be uniformly maintained in each of them. Applying the discharge voltage to an electrode generates a plasma discharge in the discharge spaces so that the surface light source device emits light.

However, mercury ions may concentrate in a specific region, thereby blackening the region due to an electric potential difference, a geometrical shape of the light source body, or the like. Consequently, uniformity of the light from the surface light source device may deteriorate, and the lifetime of the surface light source device may decrease.

SUMMARY OF THE INVENTION

The present invention provides a surface light source device that may have an improved light emitting characteristic and increased lifetime.

The present invention also provides a liquid crystal display apparatus having the above surface light source device.

Additional features of the invention will be set forth in the description which follows, and in part will be apparent from the description, or may be learned by practice of the invention.

The present invention discloses a surface light source device including a first substrate and a second substrate having a plurality of space-dividing portions dividing an inner space between the first substrate and the second substrate into a plurality of discharge regions. First and second electrodes have a plurality of openings corresponding to the space-dividing portions.

The present invention also discloses a liquid crystal display apparatus including a surface light source device, a receiving container that receives the surface light source device, and a liquid crystal display panel that displays an image using a light from the surface light source device. The surface light source device comprises a light source body having a plurality of space-dividing portions dividing an inner space of the light source body into a plurality of discharge regions. A first electrode is formed on an outer face of the light source body and it extends in a direction intersecting a longitudinal direction of the space-dividing portions. A second electrode is formed on the outer face of the light source body and it extends in the direction intersecting the longitudinal direction of the space-dividing portions. The first and second electrodes have a plurality of openings corresponding to the space-dividing portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF EMBODIMENTS

Hereinafter, embodiments of the present invention will be described in detail with reference to the accompanied drawings.

Figure 1:
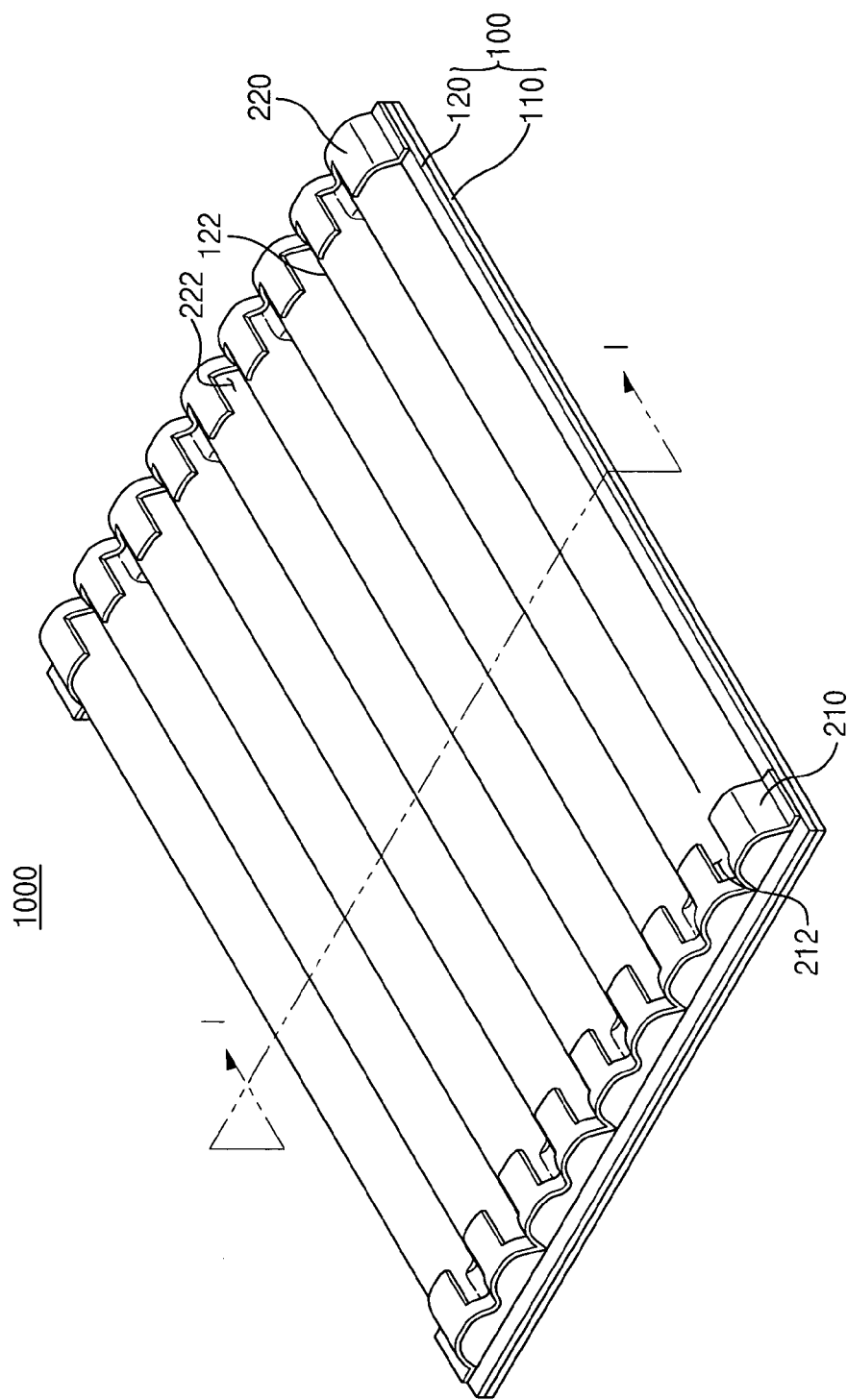
FIG. 1 is a perspective view showing a surface light source device according to an exemplary embodiment of the present invention.
Figure 2:
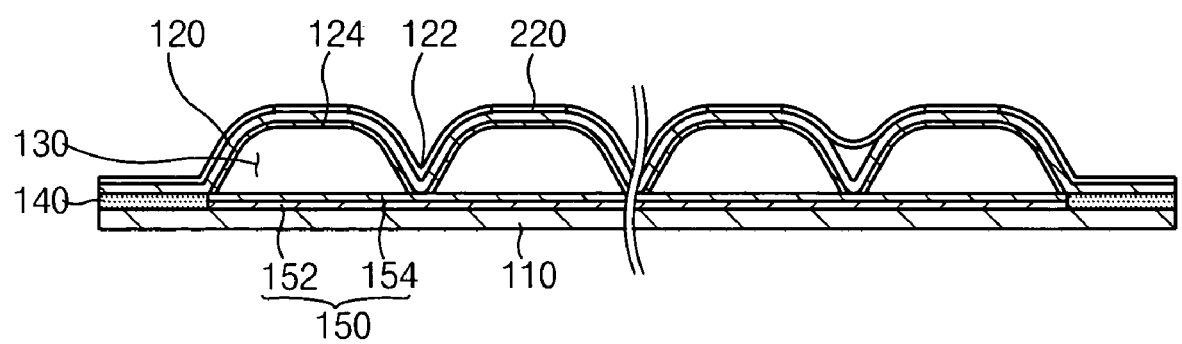
FIG. 2 is a cross-sectional view taken along line I-I' of FIG. 1.

FIG. 1 is a perspective view showing a surface light source device according to an exemplary embodiment of the present invention, and FIG. 2 is a cross-sectional view taken along line I-I' of FIG. 1.

Referring to FIG. 1 and FIG. 2, a surface light source device 1000 may include a light source body 100 that generates light and first and second electrodes 210 and 220 that apply a discharge voltage to the light source body 100.

The light source body 100 has a first substrate 110 and a second substrate 120, which may be coupled to each other to provide an inner space therebetween.

The first substrate 110 may have a rectangular plate shape, and it may be a transparent substrate, such as glass, that transmits visible rays and blocks ultraviolet rays.

The second substrate 120 may be coupled to the first substrate 110 to provide the inner space, and it may also be a transparent substrate, such as glass. The second substrate 120 has a plurality of space-dividing portions 122 space-dividing portioned toward the first substrate 110, thereby dividing the inner space into a plurality of discharge regions. The space-dividing portions 122 may be uniformly spaced apart from each other and substantially parallel to each other. The second substrate 120 may be formed by a molding method. Specifically, a plate-shaped base substrate, like the first substrate 110, may be heated and molded to form the second substrate 120.

In the present exemplary embodiment, the second substrate 120 has a cross-sectional profile of a plurality of half-arches as shown in FIG. 2. However, the second substrate 120 may have various cross-sectional profiles including a semicircle and a square.

The second substrate 120 may be combined with the first substrate 110 by an adhesive member 140, such as a melted-leaded glass, which may be formed between the first and second substrates. After the adhesive member 140 is heated with the first and second substrates 110 and 120, the substrates may be combined with each other. In the present exemplary embodiment, since the adhesive member 140 is formed at an edge of the first and second substrates 110 and 120, the space-dividing portions 122 may be cohered onto the first substrate 110 due to a difference between an inner pressure and an outer pressure thereof. Specifically, a discharge gas for a plasma discharge may be injected into a plurality of discharge spaces 130 between the first and second substrates 110 and 120. The discharge gas may have a gas pressure of about 50 torr inside the discharge spaces 130, which is less than an atmospheric pressure of 760 torr outside the discharge spaces 130. Hence, the space-dividing portions 122 may be cohered onto the first substrate 110, and the discharge spaces 130 may be formed between the first and second substrates 110 and 120.

In the present exemplary embodiment, the first and second electrodes 210 and 220 may be formed on both ends of an outer face of the second substrate 120, respectively, and they may extend in a direction substantially perpendicular to a longitudinal direction of the space-dividing portions 122. Each of the first and second electrodes 210 and 220 may include a conductive material such as copper (Cu), nickel (Ni), aluminum (Al) tape, silver (Ag) paste, and other like materials. Each of the first and second electrodes 210 and 220 has a surface area sufficient to supply excitation energy into the discharge spaces 130.

As described above, the first and second electrodes 210 and 220 intersect with the space-dividing portions 122 because the electrodes extend in the direction perpendicular to the longitudinal direction of the space-dividing portions 122. Mercury ions caused by the plasma discharge may concentrate into a region where the first and second electrodes 210 and 220 intersect with each of the space-dividing portions 122, so that the region may be blackened.

Thus, in order to prevent this blackening, the first and second electrodes 210 and 220 may have a plurality of openings 212 and 222, respectively. The openings 212 and 222 may be respectively formed at positions corresponding to the region where the first and second electrodes 210 and 220 intersect each of the space-dividing portions 122. Thus, the first and second electrodes 210 and 220 may prevent this region from being blackened due to the mercury ions, and they may also reduce an amount of the mercury ions concentrated in the region.

In the present exemplary embodiment, the first and second electrodes 210 and 220 are formed on the outer face of the second substrate 120. However, the first and second electrodes 210 and 220 may be formed on an outer face of the first substrate 110, or they may be formed on both outer faces of the first and second substrates 110 and 120.

The surface light source device 1000 may further include a lower layer 150 formed on an inner face of the first substrate 110 facing the second substrate 120. The lower layer 150 may be formed over the inner face of the first substrate 110 except where the adhesive member 140 is formed. The lower layer 150 may comprise a reflecting layer 152 and a first fluorescent layer 154. The reflecting layer 152 may be formed between the first substrate 110 and the first fluorescent layer 154 to reflect a light to the second substrate 120. The first fluorescent layer 154 may be formed on the reflecting layer 152, and the plasma discharge generates the ultraviolet rays that excite the fluorescent layer and cause it to emit visible rays.

The surface light source device 1000 may further include a second fluorescent layer 124 formed on an inner face of the second substrate 120 facing the first substrate 110. The second fluorescent layer 124 may also be excited by the plasma discharge's ultraviolet rays to emit visible rays.

Although not shown in FIG. 1 and FIG. 2, the surface light source device 1000 may further include a protecting layer formed between the second substrate 120 and the second fluorescent layer 124. The protecting layer may prevent a chemical reaction between the second substrate 120 and the mercury of the discharge gas.

Figure 3:
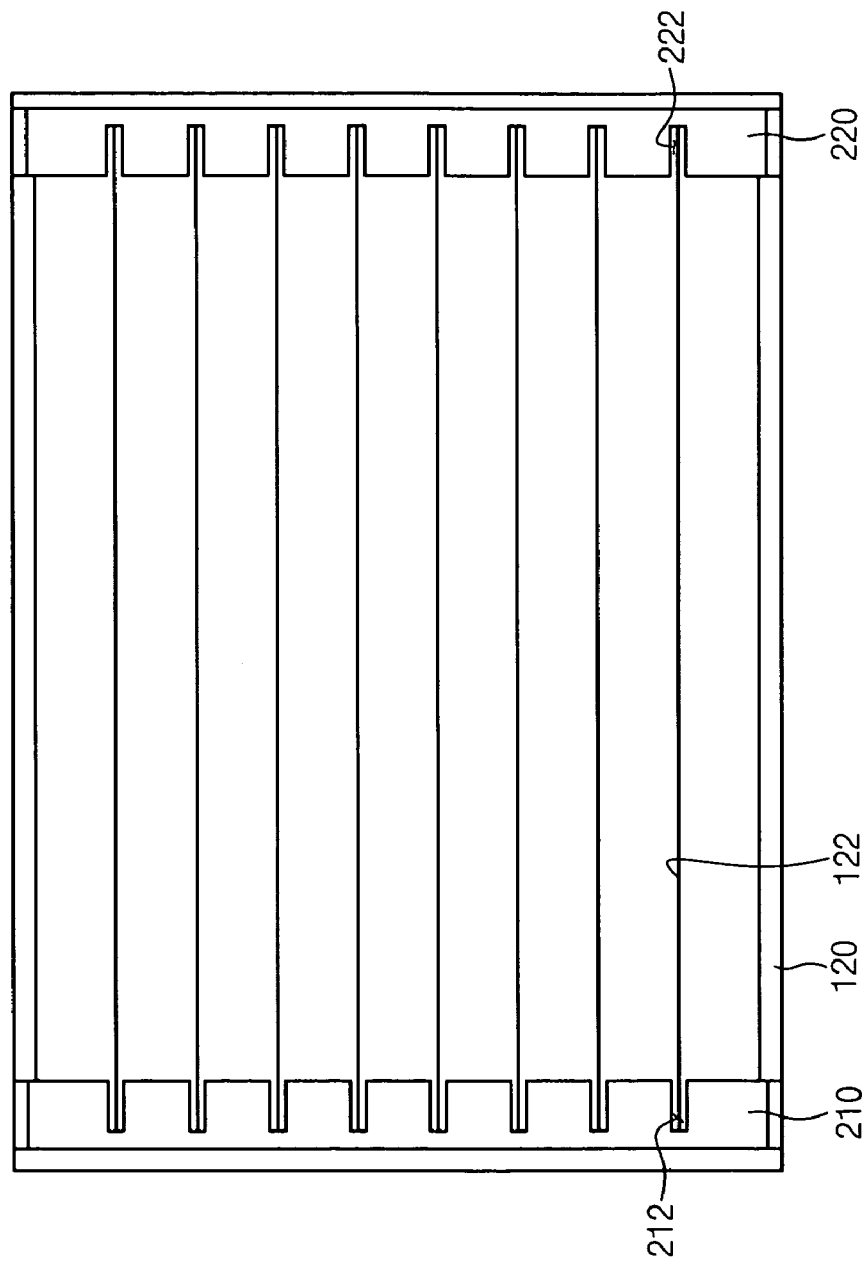
FIG. 3 is a plan view showing the surface light source device of FIG. 1.
Figure 4:
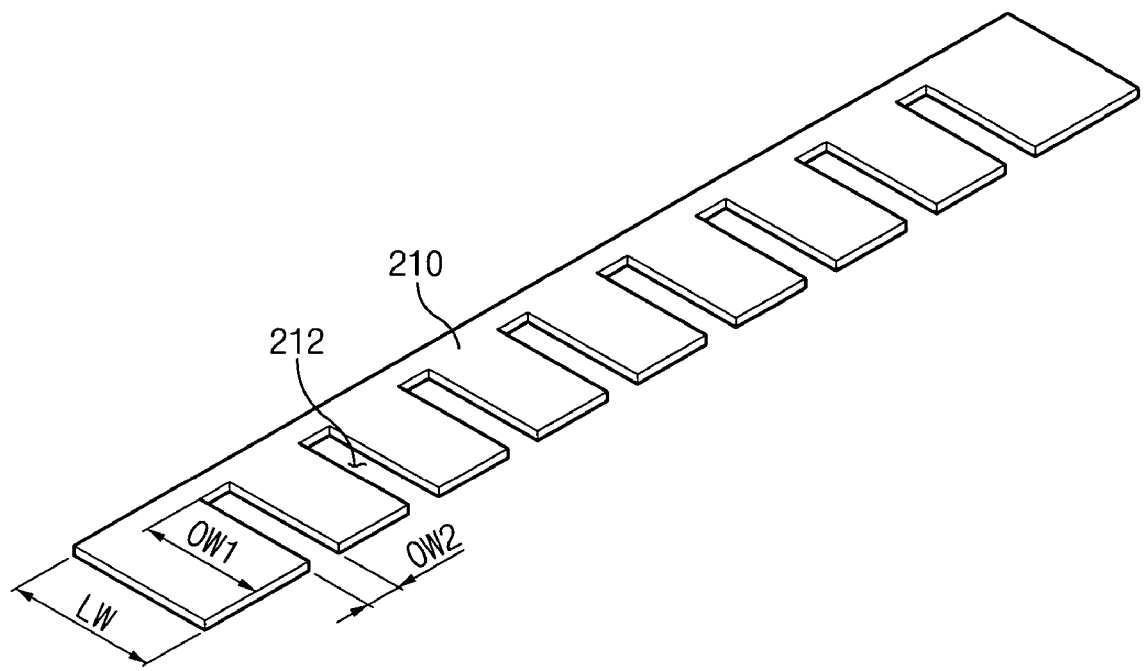
FIG. 4 is a perspective view showing a first electrode of FIG. 1.

FIG. 3 is a plan view showing the surface light source device of FIG. 1, and FIG. 4 is a perspective view showing a first electrode of FIG. 1.

Referring to FIG. 3 and FIG. 4, the first and second electrodes 210 and 220 are disposed at both ends of the second substrate 120, respectively. The first and second electrodes 210 and 220 may be arranged in the direction intersecting the longitudinal direction of the space-dividing portions 122, and they are substantially parallel to each other. Each of the first and second electrodes 210 and 220 has the openings 212 and 222, respectively, corresponding to the space-dividing portions 122.

In the present exemplary embodiment, the first electrode 210 has the same structure and function as the second electrode 220. Thus, the first electrode 210 will be is described in detail, and the detailed description of the second electrode 220 will be omitted.

The first electrode 210 may be formed in a band shape having a first line width LW, and it has the openings 212 corresponding to the space-dividing portions 122. In order to form the openings 212, portions of the first electrode 210 may be partially removed by a predetermined length from an inner end adjacent to the second electrode 220 to an outer end of the first electrode 210. The openings 212 have a first opening width $OW_1$, which is smaller than the first line width LW, in the longitudinal direction of the space-dividing portions 122. The openings 212 also have a second opening width $OW_2$ in the direction substantially perpendicular to the longitudinal direction of the space-dividing portions 122. Further, the openings 212 may be symmetrically formed about the space-dividing portions 122. In the present exemplary embodiment, the first opening width $OW_1$ may be substantially equal to the first line width LW in a range where the first electrode 210 is not broken. The second opening width $OW_2$ may be about 4 mm, and a center line of one of the space-dividing portions 122 may be positioned at a center portion of the second opening width $OW_2$ of a corresponding opening.

In the present exemplary embodiment, the openings 212 have a rectangular shape, but the openings 212 may have various shapes, including having rounded corners.

The surface light source device 1000 may have a first connection path connecting the discharge spaces 130 adjacent thereto so that the discharge gas may be uniformly injected into the discharge spaces 130.

Figure 5:
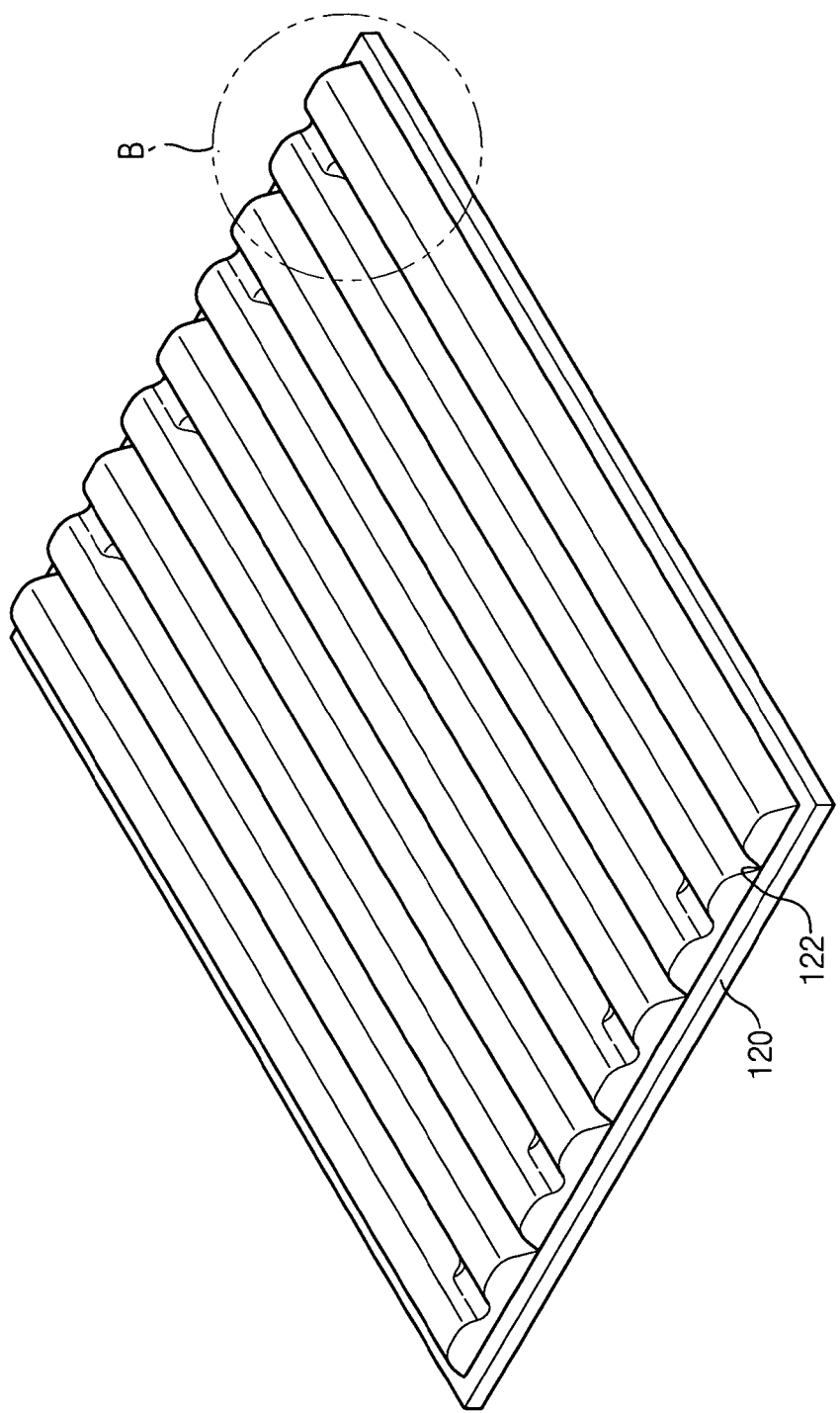
FIG. 5 is a perspective view showing the second substrate of FIG. 1.
Figure 6:
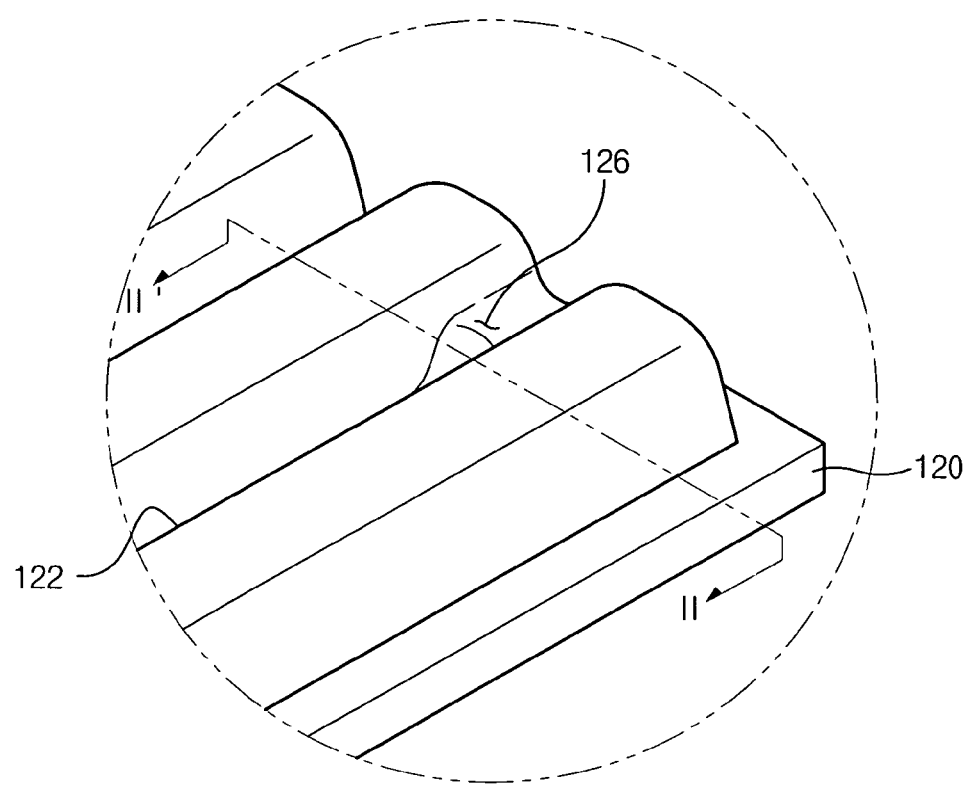
FIG. 6 is a partially enlarged view showing the portion 'B' of FIG. 5.
Figure 7:
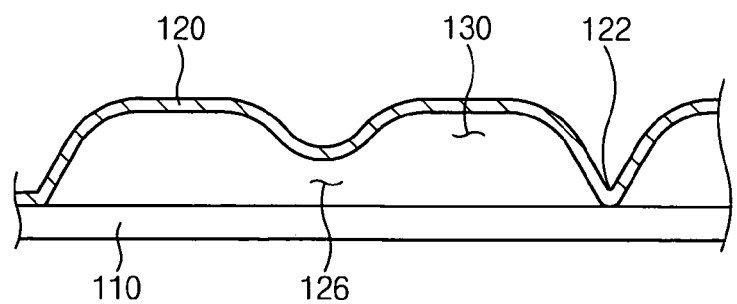
FIG. 7 is a cross-sectional view taken along line II-II' of FIG. 6.

FIG. 5 is a perspective view showing the second substrate of FIG. 1, FIG. 6 is a partially enlarged view showing the portion 'B' of FIG. 5, and FIG. 7 is a cross-sectional view taken along line II-II' of FIG. 6.

Referring to FIG. 5, FIG. 6 and FIG. 7, the second substrate 120 has the space-dividing portions 122 defining the discharge spaces 130.

Each of the space-dividing portions 122 may have the first connection path 126 spaced apart from the first substrate 110 by a predetermined distance so as to connect adjacent discharge spaces 130. As FIG. 5 shows, each of the space-dividing portions 122 has at least one first connection path 126, and the first connection path 126 may be alternately formed at first and second ends of adjacent space-dividing portions 122. That is, if the first connection path 126 is formed at the first end of a first space-dividing portion 122, the first connection path 126 of the adjacent space-dividing portion 122 is formed at the second end of the adjacent space-dividing portion. The first connection path 126 may be formed by slightly recessing the second substrate 120 when molding the substrate.

Thus, the discharge gas injected into one of the discharge spaces 130 may be provided to another discharge space through the first connection path 126, so that the discharge gas may be uniformly provided to all discharge spaces 130.

Figure 8:
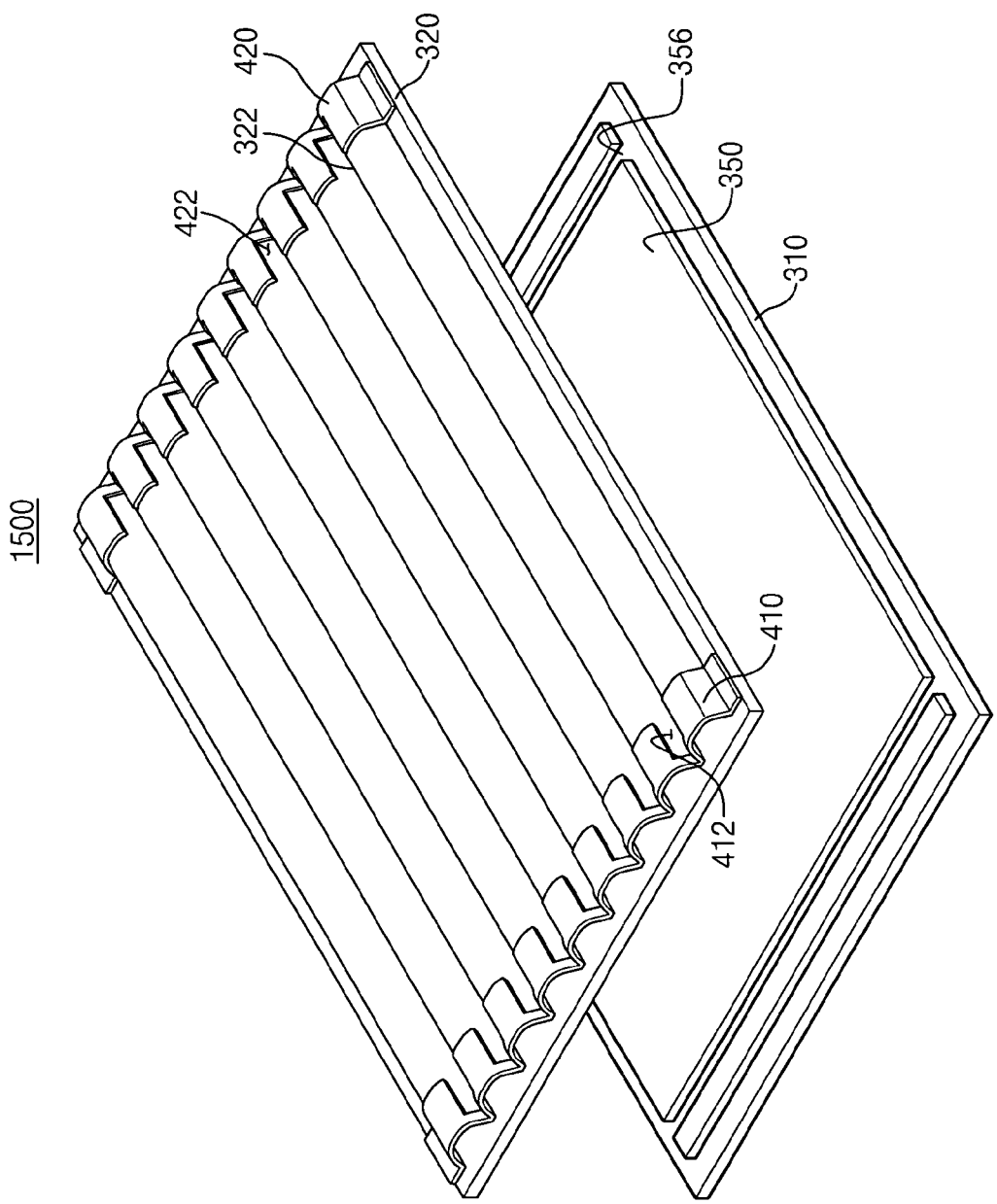
FIG. 8 is an exploded perspective view showing a surface light source device according to an exemplary embodiment of the present invention.

FIG. 8 is an exploded perspective view showing a surface light source device according to an exemplary embodiment of the present invention.

Referring to FIG. 8, a surface light source device 1500 may include a first substrate 310, a second substrate 320, a first electrode 410, a second electrode 420 and a lower layer 350.

The first substrate 310 may have a rectangular plate shape, and it may be a transparent substrate, such as glass, that transmits visible rays and blocks ultraviolet rays.

The second substrate 320 is coupled to the first substrate 310 to provide the inner space. The second substrate 320 may also be a transparent substrate, such as glass. The second substrate 320 has a plurality of space-dividing portions 322 recessed toward the first substrate 310, thereby dividing the inner space into a plurality of discharge regions. The space-dividing portions 322 may contact the first substrate 310 to form the discharge spaces.

The first and second electrodes 410 and 420 may be formed at both ends of at least one outer face of the first substrate 310 or the second substrate 320, respectively, and they extend in a direction substantially perpendicular to a longitudinal direction of the space-dividing portions 322. The first and second electrodes 410 and 420 include a plurality of openings 412 and 422, respectively, to prevent the electrodes from being blackened. The openings 412 and 422 may be respectively formed at regions where the first and second electrodes 410 and 420 intersect each of the space-dividing portions 322.

The lower layer 350 is formed on an inner face of the first substrate 310 facing the second substrate 320. The lower layer 350 may have a light reflecting layer and a fluorescent layer that converts ultraviolet rays into visible rays.

The lower layer 350 may have a second connection path 356 connecting adjacent discharge spaces so that the discharge gas may be uniformly injected into the discharge spaces. The second connection path 356 extends in the direction substantially perpendicular to the longitudinal direction of the space-dividing portions 322, thereby intersecting the space-dividing portions 322. The lower layer 350 may be thinner at a position corresponding to the second connection path 356 than at a position not corresponding to the second connection path 356. The lower layer 350 may be partially removed or thinly coated to form the second connection path 356. Alternatively, it may be entirely removed to form the second connection path 356. When a portion of the lower layer 350 corresponding to the second connection path 356 is partially or entirely removed, a shadow may be formed at the surface light source device 1500, thereby deteriorating display quality. Accordingly, the second connection path 356 may be formed at a non-effective light emitting region such that the first and second electrodes 410 and 420 overlap the second connection path 356.

Figure 9:
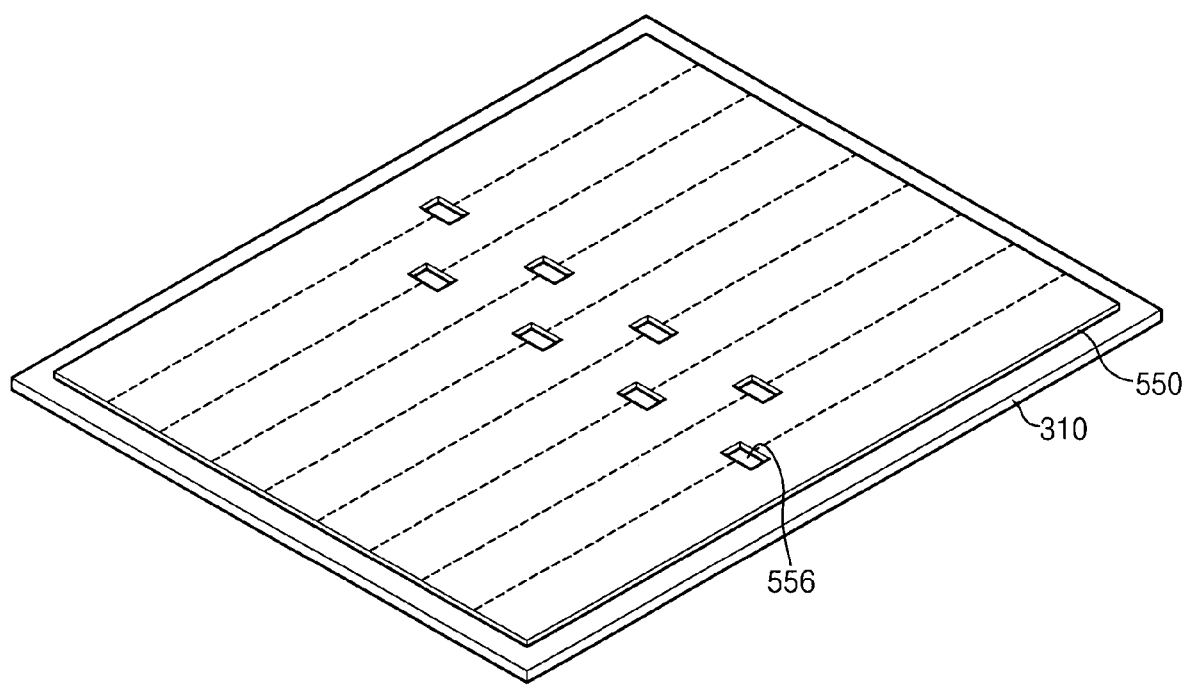
FIG. 9 is a perspective view showing a second connection path according to an exemplary embodiment of the present invention.

FIG. 9 is a perspective view showing an alternative second connection path according to an exemplary embodiment of the present invention.

Referring to FIG. 9, the lower layer 550 formed on the first substrate 310 may include a plurality of second connection paths 556 formed at positions that respectively correspond to the space-dividing portions, which are shown by the dotted lines.

The second connection paths 556 may be formed between both ends of the space-dividing portions such that the second connection paths 556 intersect the space-dividing portions. The second connection paths 556 formed at adjacent space-dividing portions may be spaced apart from each other. In the present exemplary embodiment, the second connection paths 556 are formed in a zigzag shape. However, other shapes are possible.

The second connection paths 556 may be formed in an effective light emitting region, so that the lower layer 550 corresponding to the second connection paths 556 is not completely removed. The lower layer 550 corresponding to the second connection paths 556 is thinner than the lower layer 550 where the second connection paths 556 are not formed, thereby preventing deterioration of the display quality. The second connection paths 556 may have various shapes including a square shape, a rectangular shape, and a circular shape.

Figure 10:
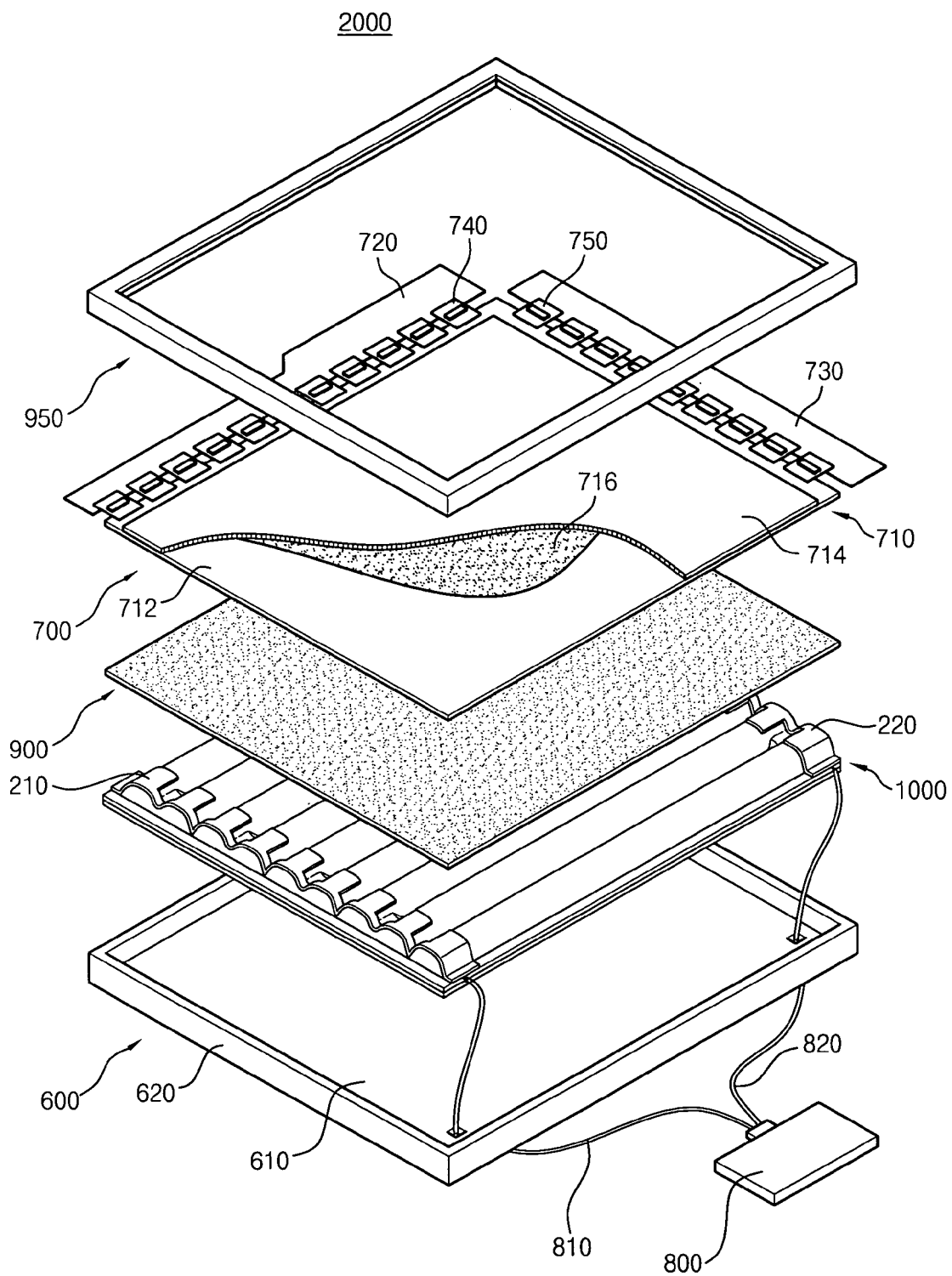
FIG. 10 is an exploded perspective view showing a liquid crystal display apparatus according to an exemplary embodiment of the present invention.

FIG. 10 is an exploded perspective view showing a liquid crystal display apparatus according to an exemplary embodiment of the present invention. In FIG. 10, the same reference numerals denote the same elements in FIGS. 1 to 9, and thus detailed descriptions of the same elements will be omitted.

Referring to FIG. 10, a liquid crystal display apparatus 2000 may include a surface light source device 1000, a receiving container 600 and a display unit 700.

The display unit 700 may comprise a liquid crystal display panel 710 displaying an image, and data and gate printed circuit boards 720 and 730 applying driving signals to the panel. The driving signals from the data and gate printed circuit boards 720 and 730 may be applied to the liquid crystal display panel 710 through data and gate tape carrier packages 740 and 750, respectively.

The liquid crystal display panel 710 may have a thin film transistor (TFT) substrate 712, a color filter substrate 714 coupled to the TFT substrate 712, and liquid crystal 716 interposed between the TFT and color filter substrates.

The TFT substrate 712 may be a transparent glass substrate on which TFTs are formed in a matrix configuration. The TFTs may have a source coupled to a data line, a gate coupled to a gate line, and a drain coupled to a pixel electrode (not shown) comprising a transparent, conductive material.

RGB pixels (not shown), which are color pixels for emitting predetermined colors when the light passes therethrough, may be formed on the color filter substrate 714 by a thin film process. The color filter substrate 714 may further include a common electrode (not shown) formed thereon. The common electrode comprises a transparent, conductive material.

Applying a power to the gate of the TFT turns the TFT on and generates an electric field between the pixel electrode and the common electrode of the color filter substrate 714. The electric field may vary an aligning angle of the liquid crystal 716 interposed between the TFT substrate 712 and the color filter substrate 714. Thus, a light transmittance of the liquid crystal varies in accordance with the variation of its aligning angle, so a desired image may be obtained.

The receiving container 600 may include a bottom 610 and a sidewall 620 extended from an end of the bottom so as to provide a receiving space for receiving the surface light source device 1000. The sidewall 620 extends in a direction substantially perpendicular to the bottom 610, and it may contact the surface light source device 1000, thereby preventing the device from moving in the receiving space.

The liquid crystal display apparatus 2000 may further include an inverter 800, an optical member 900, and a top chassis 950.

The inverter 800 may be disposed on a rear face of the receiving container 600, and it generates a discharge voltage to drive the surface light source device 1000. The inverter's discharge voltage may be applied to the first and second electrodes 210 and 220 of the surface light source device 1000 via a first power line 810 and a second power line 820, respectively.

The optical member 900 may be disposed between the surface light source device 1000 and the display unit 700. The optical member 900 enhances brightness uniformity of the light from the surface light source device 1000. The optical member 900 may have a diffusing sheet or a diffusing plate. Also, the optical member 900 may further include an optical sheet, such as a prism sheet, to enhance brightness of the light supplied to the liquid crystal display panel 710.

The top chassis 950 may be coupled to the receiving container 600 to wrap an edge of the liquid crystal display panel 710. The top chassis 950 prevents the liquid crystal display panel 710 from being damaged and from separating from the receiving container 600.

According to the surface light source device and the liquid crystal display apparatus of the present invention, the first and second electrodes may be formed on the outer face of the first substrate or the second substrate. The first and second electrodes have openings formed at regions where the electrodes intersect with the space-dividing portions formed at the second substrate.

The first and second electrodes having the openings may prevent the regions from being blackened due to concentrated mercury ions, thereby improving uniformity of the light generated from the surface light source device. Furthermore, the first and second electrodes having the openings may reduce the mercury ions, thereby increasing the lifetime of the surface light source device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A surface light source device, comprising:
   a first substrate;
   a second substrate having a plurality of space-dividing portions dividing an inner space between the first substrate and the second substrate into a plurality of discharge regions;
   a first electrode having a plurality of openings corresponding to the space-dividing portions; and
   a second electrode having a plurality of openings corresponding to the space-dividing portions.

2. The surface light source device of claim 1, wherein the first electrode and the second electrode are formed on an outer face of the second substrate.

3. The surface light source device of claim 1, wherein the first electrode and the second electrode are formed on an outer face of the first substrate.

4. The surface light source device of claim 1, wherein the space-dividing portions are spaced apart from each other and substantially parallel to each other.

5. The surface light source device of claim 1,
   wherein the first electrode and the second electrode extend in a direction substantially perpendicular to a longitudinal direction of the space-dividing portions, and
   wherein the first electrode and the second electrode have a first line width.

6. The surface light source device of claim 5,
   wherein the openings of the first electrode and the openings of the second electrode have a first opening width in the longitudinal direction of the space-dividing portions, and
   wherein the first opening width is smaller than the first line width.

7. The surface light source device of claim 5,
   wherein the openings of the first electrode and the openings of the second electrode have a second opening width in a direction substantially perpendicular to the longitudinal direction of the space-dividing portions, and wherein the openings of the first electrode and the openings of the second electrode are symmetrical with respect to the space-dividing portions.

8. The surface light source device of claim 7, wherein the second opening width is equal to or greater than about 4 mm.

9. The surface light source device of claim 1, wherein the space-dividing portions comprise a first connection path connecting adjacent discharge regions, and wherein the first connection path is spaced apart from the first substrate.

10. The surface light source device of claim 9, wherein the first connection path is alternately formed at opposite ends of the space-dividing portions.

11. The surface light source device of claim 1, further comprising:

a lower layer formed on an inner face of the first substrate facing the second substrate, wherein the lower layer contacts the space-dividing portions.

12. The surface light source device of claim 11, wherein the lower layer comprises a second connection path connecting adjacent discharge regions, and wherein the second connection path extends in a direction substantially perpendicular to a longitudinal direction of the space-dividing portions.

13. The surface light source device of claim 12, wherein the lower layer is thinner at a region corresponding to the second connection path than at a region not corresponding to the second connection path.

14. The surface light source device of claim 11, wherein the lower layer comprises:

a reflective layer; and a first fluorescent layer formed on the reflective layer.

15. The surface light source device of claim 11, further comprising a second fluorescent layer formed on an inner face of the second substrate facing the first substrate.

16. A liquid crystal display apparatus, comprising:

a surface light source device;

a receiving container that receives the surface light source device; and a liquid crystal display panel that displays an image using a light from the surface light source device, wherein the surface light source device comprises:

a light source body having a plurality of space-dividing portions dividing an inner space of the light source body into a plurality of discharge regions;

a first electrode formed on an outer face of the light source body and extending in a direction intersecting a longitudinal direction of the space-dividing portions; and a second electrode formed on the outer face of the light source body and extending in the direction intersecting the longitudinal direction of the space-dividing portions, wherein the first electrode has a plurality of openings corresponding to the space-dividing portions, wherein the second electrode has a plurality of openings corresponding to the space-dividing portions.

17. The liquid crystal display apparatus of claim 16, wherein the light source body comprises:

a first substrate; and a second substrate, wherein the space-dividing portions are formed in the second substrate and are recessed toward the first substrate.

18. The liquid crystal display apparatus of claim 17, wherein the first electrode and the second electrode are formed either on an outer surface of the first substrate or an outer surface of the second substrate, wherein the first electrode and the second electrode intersect with the space-dividing portions, and wherein the first electrode and the second electrode have a first line width.

19. The liquid crystal display apparatus of claim 18, wherein the openings of the first electrode and the openings of the second electrode have a first opening width in the longitudinal direction of the space-dividing portions, and wherein the first opening width is smaller than the first line width.

20. The liquid crystal display apparatus of claim 18, wherein the openings of the first electrode and the openings of the second electrode have a second opening width in a direction substantially perpendicular to the longitudinal direction of the space-dividing portions, and wherein the openings of the first electrode and the openings of the second electrode are symmetrical with respect to the space-dividing portions.

21. The liquid crystal display apparatus of claim 16, further comprising a diffusive member disposed between the surface light source device and the liquid crystal display panel so as to enhance brightness uniformity of the light from the surface light source device.

* * * * *